(12) United States Patent
Matzdorf et al.

(10) Patent No.: US 9,243,150 B2
(45) Date of Patent: Jan. 26, 2016

(54) OXIDE COATED METAL PIGMENTS AND FILM-FORMING COMPOSITIONS

(75) Inventors: Craig Matzdorf, California, MD (US); William Nickerson, Reston, VA (US)

(73) Assignee: The United States of America As Represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 13/564,341

(22) Filed: Aug. 1, 2012

(65) Prior Publication Data

US 2013/0168612 A1    Jul. 4, 2013

Related U.S. Application Data

(63) Continuation-in-part of application No. 13/192,158, filed on Jul. 27, 2011, now Pat. No. 8,277,688, which is a continuation-in-part of application No. 13/010,830, filed on Jan. 21, 2011, now Pat. No. 8,262,938, and a continuation-in-part of application No. 11/116,166, filed on Apr. 21, 2005, now abandoned.

(51) Int. Cl.
| | |
|---|---|
| *C23F 11/00* | (2006.01) |
| *C09D 5/00* | (2006.01) |
| *C09D 5/08* | (2006.01) |
| *C09D 5/10* | (2006.01) |
| *C09D 7/12* | (2006.01) |
| *C23F 11/08* | (2006.01) |
| *C22C 21/00* | (2006.01) |
| *C23F 11/10* | (2006.01) |

(52) U.S. Cl.
CPC .... *C09D 5/00* (2013.01); *C09D 5/082* (2013.01); *C09D 5/10* (2013.01); *C09D 7/1291* (2013.01); *C23F 11/00* (2013.01); *C22C 21/00* (2013.01); *C23F 11/08* (2013.01); *C23F 11/10* (2013.01)

(58) Field of Classification Search
CPC ........ C22C 21/00; C22C 21/10; C22C 21/16; C23F 13/02; C23F 13/14; C23F 13/08; C23F 13/16; C23F 13/005; C23F 2213/30; C23F 11/00; C23F 11/08; C23F 11/10; H01B 1/00

USPC ............ 252/519.3, 519.33, 387, 388, 389.52; 427/455, 456; 205/730, 732

See application file for complete search history.

(56) References Cited

U.S. PATENT DOCUMENTS

| | | | |
|---|---|---|---|
| 4,606,967 A | 8/1986 | Mosser | |
| 4,631,172 A | 12/1986 | Yamamoto et al. | |
| 5,336,303 A | 8/1994 | Cocks | |
| 5,547,560 A * | 8/1996 | Le Guyader | ............... 205/732 |
| 6,224,657 B1 | 5/2001 | Myers et al. | |
| 6,375,762 B1 | 4/2002 | Deimel | |
| 6,669,764 B1 | 12/2003 | Matzdorf et al. | |
| 2007/0096060 A1 | 5/2007 | Arafat et al. | |
| 2007/0128351 A1 | 6/2007 | Nanna et al. | |
| 2007/0134503 A1 * | 6/2007 | Espinosa | ................. 428/450 |
| 2009/0020185 A1 | 1/2009 | Inoue | |
| 2010/0180793 A1 | 7/2010 | Dingwerth et al. | |
| 2010/0197836 A1 | 8/2010 | Price et al. | |
| 2010/0288978 A1 * | 11/2010 | Walsh | ................. 252/389.52 |
| 2010/0310806 A1 | 12/2010 | Stoll et al. | |
| 2011/0070429 A1 | 3/2011 | Rochester et al. | |
| 2011/0129609 A1 | 6/2011 | Espinosa | |
| 2011/0159175 A1 | 6/2011 | Groh et al. | |
| 2012/0187350 A1 | 7/2012 | Matzdorf et al. | |

FOREIGN PATENT DOCUMENTS

| | | |
|---|---|---|
| WO | WO 2006088519 A2 | 8/2006 |
| WO | PCT/US13/46094 | 2/2015 |

* cited by examiner

*Primary Examiner* — Mark Kopec
*Assistant Examiner* — Haidung Nguyen
(74) *Attorney, Agent, or Firm* — Mark O. Gluy; NAWCAD

(57) ABSTRACT

This invention relates to sacrificial-metal pigments coated with an effective amount of at least one metal oxide or a combination of metal oxides such as a chromium-zirconium oxide, and the process for preparing said coated pigments and combination thereof with film-forming binders for coating metal substrates to inhibit corrosion. The coated sacrificial-metal pigments are electrically active to prevent corrosion of metal substrates that are more cathodic (electropositive) than the metal oxide coated metal pigments.

8 Claims, 4 Drawing Sheets

OXIDE COATED METAL PIGMENTS AND FILM-FORMING COMPOSITIONS

This application is a continuation-in-part of application Ser. No. 13/192,158 filed Jul. 27, 2011 now U.S. Pat. No. 8,277,688 B2 which in turn is a continuation-in-part of application Ser. No. 13/010,830, filed on Jan. 21, 2011 now U.S. Pat. No. 8,262,838 B2, and is a continuation-in-part of application Ser. No. 11/116,166 filed Apr. 21, 2005, now abandoned.

STATEMENT OF GOVERNMENT INTEREST

The invention described herein may be manufactured and used by or for the Government of the United States of America for governmental purposes without the payment of any royalties thereon or therefore.

FIELD OF THE INVENTION

This invention relates to sacrificial metal pigments coated with an effective amount of a corrosion inhibitor and combinations of said coated metal pigments with a film-forming binder for application to metal substrates. The combination of the coated pigments and the film-forming polymeric binder results in an electrochemically active coating composition which provides cathodic protection to various metal substrates.

Various surfaces and particularly metal surfaces require the protection of coatings especially when the surfaces are exposed to corrosive environments. Metal surfaces of aircraft, for example, are exposed to seawater which requires protection from corrosion. Specifically, aircraft, e.g., Navy aircraft, are exposed to seawater spray in addition to various acid-forming gases such as sulfur dioxide and the like. In addition to aircraft, various machinery and equipment in the industrial environments, where fossil fuels are used, also needs protection against corrosion. It is important therefore that the coating be resistant to corrosion, various chemicals, the weather and at the same time be flexible and have good adhesion to the metal substrate.

BACKGROUND

Metallic pigments are known to provide electrochemical, electrical, thermal, and other properties to compositions which are used for protecting various materials such as metal from corrosion, maintaining electrical conductivity, shielding equipment from electromagnetic fields, resisting elevated temperatures, and providing protection from moisture. Silver, gold and other noble metal pigments are used for their electrical conductivity and thermal conductivity properties. Zinc and magnesium are used for their electrochemical properties. Aluminum is used for its thermal and chemical barrier properties. A major shortcoming of the noble metals is their strong cathodic potential. When used in products for electrical and thermal management, the noble metals coupled with anodic materials like aluminum alloys are used for electrical equipment.

Metals such as zinc and magnesium are used in cured coatings to provide corrosion resistance to the metal on which they are coated. Typical zinc-rich primers use zinc "dust" which is approximately 5 micron zinc powder. This zinc powder is added untreated to various resins, organic and inorganic. Zinc-rich coatings are used mostly on steel to slow down the onset of rust or corrosion. A common secondary problem with zinc-rich coatings is the rusting or corrosion of the zinc powder in the coating while it is protecting the steel. When zinc corrodes, it typically forms a white residue which can discolor the object being protected and is not desired for aesthetic reasons. This zinc self-corrosion also "uses up" the zinc and reduces the effective life of the zinc-rich coating.

Magnesium has been used in combination with zinc and by itself in similar coatings to protect steel and aluminum respectively. Magnesium is also prone to forming white corrosion products which discolor the object being protected and is undesirable for aesthetic reasons. A second application of coatings with metal pigments is for electrical and thermal conductivity. Silver, nickel, copper and aluminum are good conductors of electricity and heat. Silver and nickel are commonly used as pigments in conductive coatings on other materials like glass, carbon/graphite, and aluminum which are lighter and less expensive. Copper is an excellent bulk conductor but is not typically used as a conductive pigment as it oxidizes quickly and loses its ability to conduct electricity effectively in coatings. Aluminum is an excellent bulk conductor, but it also oxidizes easily in the natural environment and is not effective as a conductive pigment in coatings. A third application is the protection of iron and iron alloy (steel) particles from rusting due to exposure to the environment. These particles are used in coatings for their magnetic properties and tend to red rust and lose effectiveness over time due to exposure to the environment.

This invention relates to a composition and to a process for preparing and applying a semi-conducting coating comprising at least one metal oxide onto metal particles and the use of these coated particles in coatings designed to protect substrates from corroding and provide electrical or thermal conductivity.

More specifically, this invention relates to compositions of these coated particles in various coatings, such as greases and other vehicles which are used to protect substrates from corroding (zinc or magnesium) and to provide an electrically and thermally conductive path on surfaces which have insufficient conductivity (silver, nickel, aluminum, copper) or for magnetic properties (iron). The conductive coatings are typically used for electromagnetic shielding, static dissipation, continuity, and thermally conductive pathways in the case of flexible circuits and similar applications. These metals are typically used at high purity for maximum conductivity or coating efficiency. This invention covers all of these potential alloys as long as the key property of cathodic protection (magnesium and zinc) or electrical conductivity (silver, nickel, copper and aluminum) are maintained. For example, zinc can be alloyed with nickel to yield a particle with tailored open circuit potential and controlled activity. This alloy can be coated effectively with the semi-conducting coating described by this invention to control the corrosion or white rusting of the zinc in the alloy.

It is therefore an object of this invention to incorporate electrochemically active coated-pigments into a binder to provide cathodic protection to metal substrates.

It is another object to provide cathodic protection to metal substrates by coating the substrate with a sacrificial anode coating that keeps the electrochemical potential of the substrates negative to prevent its corrosion.

It is a further object of this invention to provide metal pigments containing effective amounts of a corrosion-resistant oxide coating and the use of these coated pigments in a film-forming binder as a coating for metal substrates.

A composition identical to Example 10, except that the particles were 20 micron aluminum particles treated per Example 1 and the untreated substrate.

Figure 1:
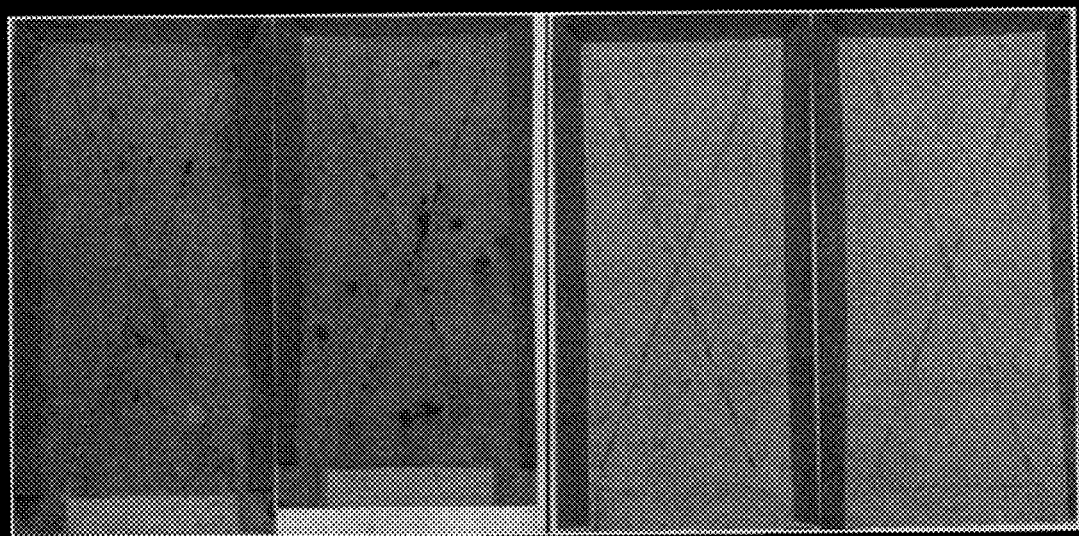
FIG. 1 shows the performance of two coatings on 7075-T6, an aluminum substrate, after exposure to the ASTM B117 salt fog for 500 hours. The coated particles are more resistant to self-corrosion which leads to white zinc oxide that is visible on the coating with the untreated zinc. Compare the coatings on 7075-T6 aluminum with untreated zinc particles in epoxy (left) and with treated zinc particles (right) after 500 hours exposure to ASTM B117, as shown in Example 10.
Figure 2:
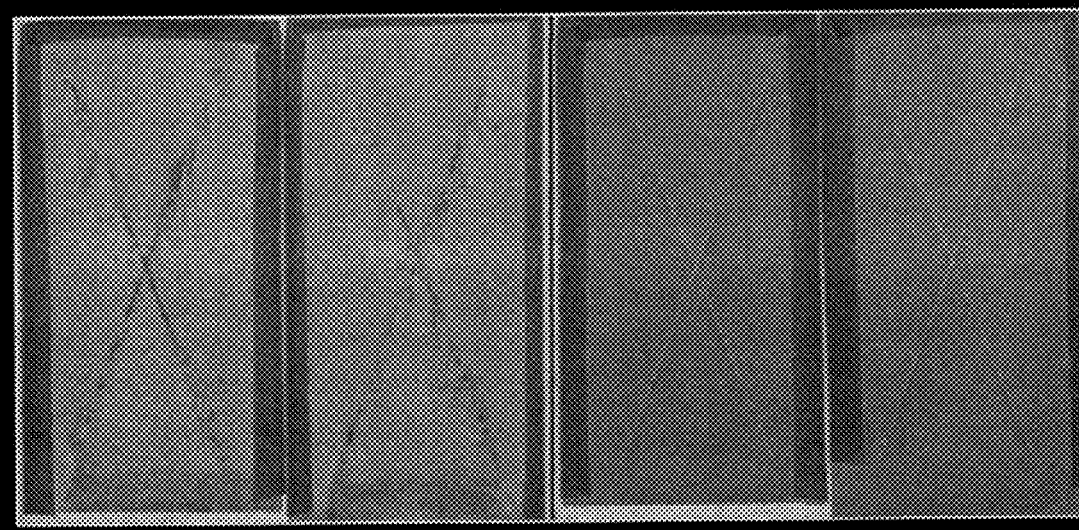

FIG. 2 shows the performance of the two coatings on 7075-T6 aluminum after exposure to the ASTM 8117 salt fog for 500 hours. It is clear that the coated particles of this invention are more resistant to self-corrosion which leads to white aluminum oxide that is visible on the coating containing the untreated aluminum particles. Compare the coatings on 7075-T6 aluminum with untreated aluminum particles in an epoxy resin (left) and with the treated aluminum particles (right) after 500 hours exposure to ASTM B117.

Composition of corrosion-resistant epoxy primer made with coated zinc and magnesium particles. An identical composition to Example 10, except that the particles were a mixture of 75% 5 micron zinc particles and 25% 100 micron magnesium particles treated and untreated.

Figure 3:
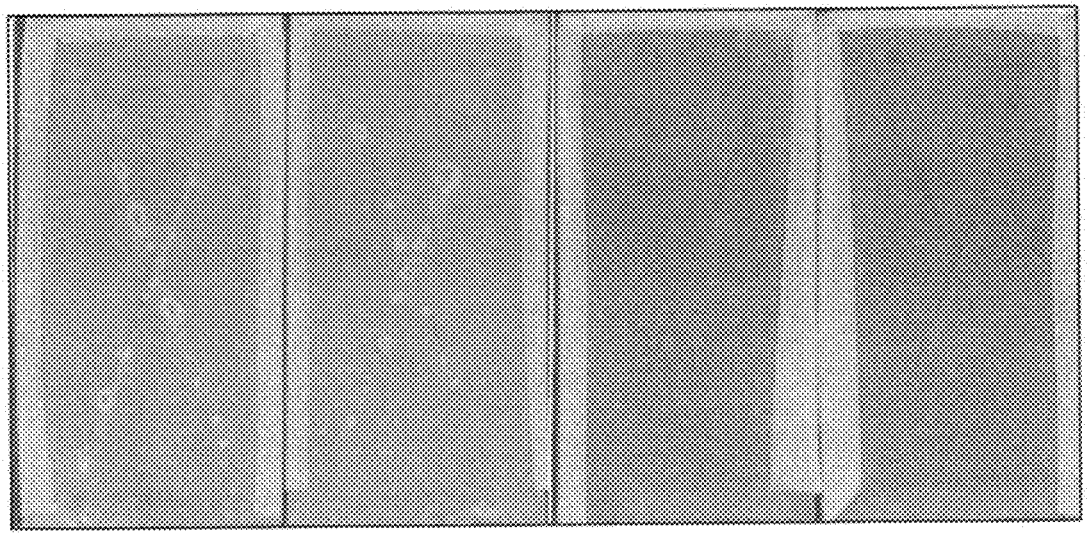

FIG. 3 shows the performance of the two coatings on 2024-T3 aluminum after exposure to the ASTM B117 salt fog for 500 hours. The coated particles are more resistant to self-corrosion which leads to white zinc and magnesium oxide that is visible on the coating with untreated particles. Coatings on 2024-T3 aluminum with untreated zinc and untreated magnesium particles in an epoxy resin (left) and with coated zinc and magnesium particles (right) after 500 hours exposure to ASTM 8117.

Figure 4:
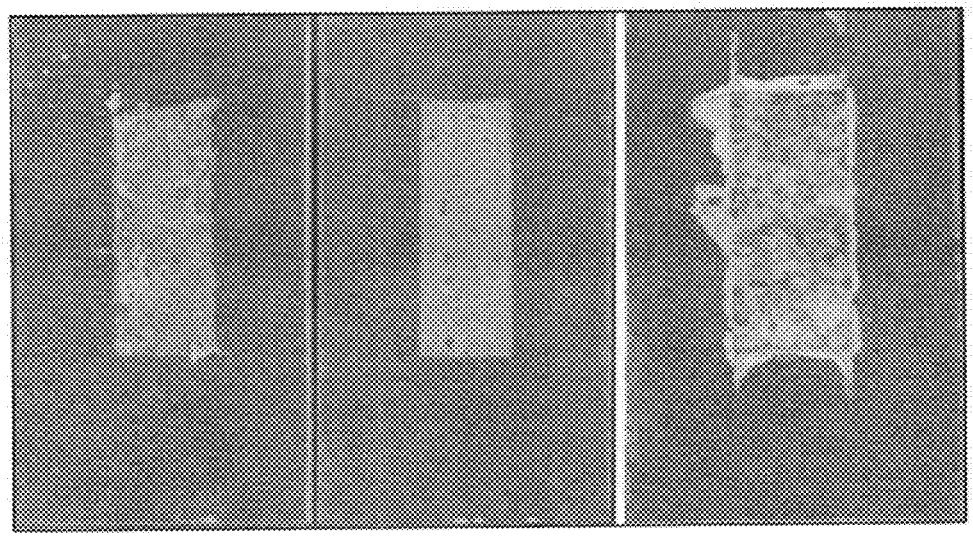

FIG. 4 shows the performance of conductive grease made with coated nickel particles. Greases made per Example 9 with uncoated and coated nickel particles were applied to 2024-T3 aluminum panels and assessed for electrical performance and corrosivity of the grease to the aluminum substrate. The uncoated nickel grease gave a dc resistance of 0.8 milliohms when applied between two aluminum panels torqued to 20 inch-pounds. The coated grease gave a dc resistance of 1.89 milliohms in similar test. This compares to 3.3 milliohms for a 15 volume percent silver grease reference.

For the applications of interest a 2.5 milliohm resistance or lower must be obtained. This data shows that the coated nickel still meets the electrical requirement. The photos show the corrosivity of the uncoated and coated nickel greases on 2024-T3 aluminum that Was exposed to ASTM B117 salt fog for 24 hours. FIG. 4 shows the aluminum after the grease was removed after the exposure. The uncoated nickel grease caused significant pitting and corrosion of the aluminum under the grease.

The coated nickel grease only caused minor surface oxidation, with no pitting. This significant reduction in corrosivity of the grease while maintaining required electrical conductivity. The silver reference grease is shown as well. It caused even more damage to the aluminum surface than the uncoated nickel, as expected since silver is more cathodic than the nickel. FIG. 4 specifically shows Aluminum 2024-T3 panels after exposure to 24 hours of ASTM B117 salt fog in contact with uncoated nickel grease (left), coated nickel grease (center) and uncoated silver reference grease (right).

Figure 5:
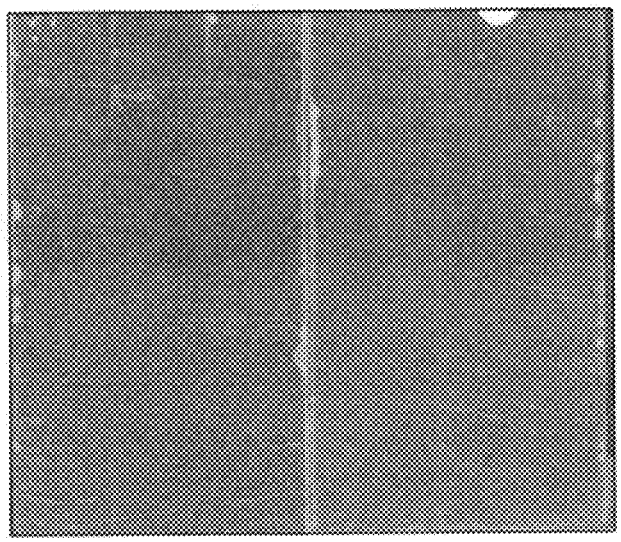

FIG. 5 shows the performance of conductive grease made with coated aluminum particles. Greases made per Example 9, except with uncoated or coated aluminum particles per Example 1 were applied to a 2024-T3 aluminum panels and assessed for electrical performance and corrosivity of the grease to the aluminum substrate. FIG. 5 shows the corrosivity of the uncoated and coated aluminum greases on 2024-T3 aluminum that was exposed to ASTM B117 salt fog for 24 hours. The figure shows the aluminum after the grease was removed after the exposure. Neither grease caused corrosion of the aluminum substrate. This is not unexpected since the open circuit potentials of the aluminum particles and aluminum substrate are similar, but validates that the coating on the aluminum particles does not change their corrosivity on the aluminum substrate. FIG. 5 specifically shows Aluminum 2024-T3 panels after exposure to 24 hours of ASTM B117 salt fog in contact with uncoated aluminum grease (left) and coated aluminum grease (right).

Figure 6A:
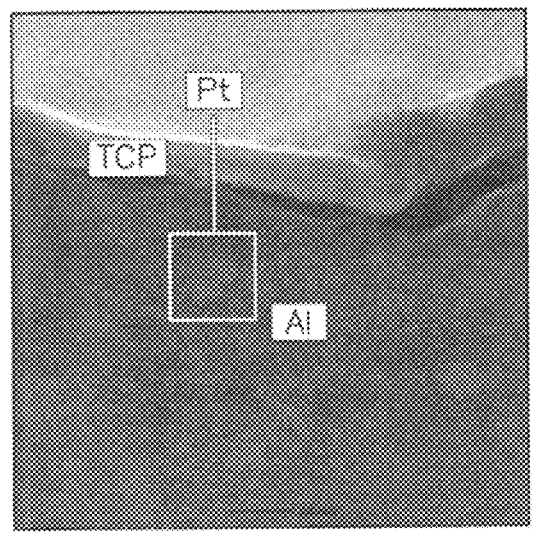
Figure 6B:
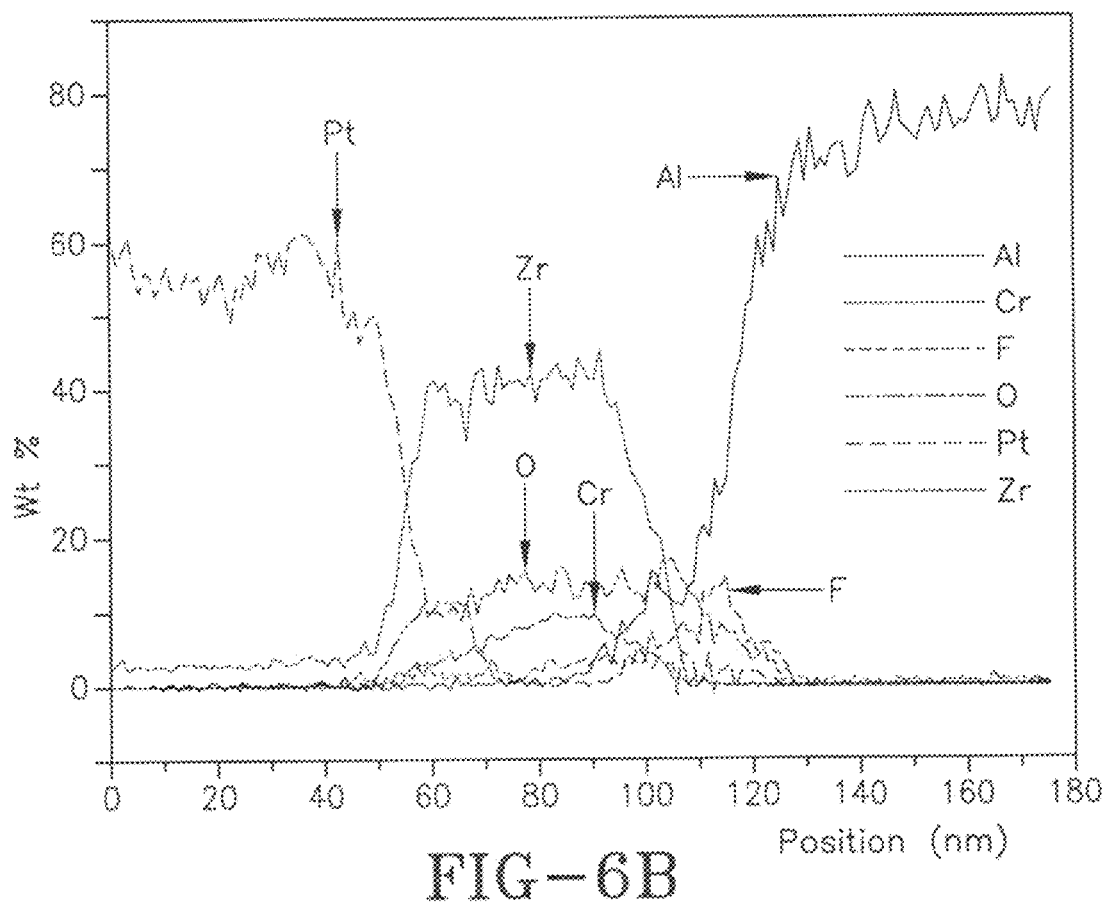

FIG. 6 shows the process of example one where (a) is the transmission electron micrograph and (b) shows the mono-EDS line profiles.

SUMMARY OF THE INVENTION

This invention is directed to coated metal pigments which have a particle size ranging from about 2 to 100 microns. The metal pigments are coated with an effective amount of a metal oxide corrosion-inhibitor. The corrosion-inhibitor is derived from an aqueous solution consisting essentially of trivalent chromium compounds, hexafluorozirconates, and at least one fluorocarbon selected from the group consisting of tetrafluoroborates, hexafluorosilicates, and hexafluorotitanates.

DETAILED DESCRIPTION

The invention relates to corrosion-inhibiting coated metal pigments and film-forming compositions thereof for coating metal substrates including, for example, substrates of aluminum, aluminum alloys, iron and various other ferrous metals such as steel.

The electrochemically corrosion-resistant metal oxide coated pigments and the film-forming coating compositions of this invention for application to metal substrates consist essentially of coated sacrificial-metal pigments having a particle size ranging from about 2 to 100 microns coated with effective amounts of at least one metal oxide; the uncoated metal pigments are selected from the group consisting of zinc, magnesium, iron, aluminum, silver, copper and nickel; said coating consist essentially of metal oxides selected from the group consisting of chromium oxide, zirconium oxide and mixtures of chromium and zirconium oxides derived from an aqueous composition consisting essentially of, in parts by weight, from 0.01 to 22 parts of a trivalent chromate, from 0.01 to 12 parts of hexafluorozirconate, from 0.01 to 12 parts of a fluorocarbon selected from the group consisting of tetrafluoroborate, hexafluorosilicate, and hexafluorotitanates, from about 0.0 to 12 parts of a divalent zinc compound and from 0.0 to 5.0 parts of a water soluble corrosion inhibitor. The water soluble corrosion inhibitors are selected from the group consisting of benzimidazole, benzothiazole, benzoxazole, diphenyltriazole, benzotriazole, and tolytriazole.

More specifically, the electrochemically corrosion-resistant compositions for application onto metal substrates consist essentially of, in parts by weight, from about 5 to 80 or 20 to 80 parts of a film-forming binder selected from the group consisting of an inorganic binder, polyurethanes, polyimides, polyacrylates, polymers derived from diisocyanates, polymers derived from epoxies and the uncured prepolymers of said polymers, from about 0.0 to 10 or 0.1 to 10 parts of at least one organic corrosion inhibitor, from about 0.0 to 5.0 or 0.1 to 1.5 parts of at least one surfactant, from about 0.0 to 5.0 parts or 1.0 to 5.0 parts of solvent, and from about 20 to 80 or 50 to 70 parts of a coated sacrificial-metal pigment having a particle size ranging from about 2 to 100 or 10 to 100 microns; said sacrificial metal pigments are coated with effective amounts of a metal oxide derived from a composition consisting essentially of, in parts by weight, an acidic aqueous solution comprising from about 0.01 to 22 parts of a trivalent chromium compound, from about 0.01 to 12 parts of hexafluorozirconate, from about 0.01 to 12 parts of at least one fluorocarbon selected from the group consisting of tetrafluoroborates, hexafluorosilicates, and hexafluorotitanates, from about 0.0 to 12 parts of at least one divalent zinc compound, and from about 0.0 to 5 parts by weight of a water soluble corrosion inhibitor. The organic and water soluble corrosion inhibitors are selected from the group consisting of benzimidazole, benzothiazol, benzoxazole, diphenyltriazole, benzotrizole, tolytriazole and mixtures thereof.

Another example of the electrochemically corrosion-resistant compositions for application onto metal substrates consisting essentially of, in parts by weight, from about 5 to 80 parts of an organic lubricant, from about 0.0 to 10 parts of at least one organic corrosion inhibitor, from about 0.0 to 5.0 parts of at least one surfactant, from about 0.0 to 5.0 parts of organic solvent, and from about 20 to 80 parts of a sacrificial-metal pigment having a particle size ranging from about 2 to 100 microns; said metal pigment coated with effective amounts of at least one metal oxide such as chromium and/or zirconium oxides, derived from a composition consisting essentially of an acidic aqueous solution consisting essentially of from about 0.01 to 22 parts of a trivalent chromium compound, from about 0.01 to 12 parts of hexafluorozirconate, from about 0.01 to 12 parts of at least one fluorocarbon selected from the group consisting of tetrafluoroborates, hexafluorosilicates, and hexafluorotitanates and from about 0.0 to 5 parts by weight of a water soluble corrosion inhibitor.

The organic corrosion inhibitors added to the coating composition are selected from the group consisting of benzimidazole, benzothiazole, benzoxazole, diphenyltriazole, benzotriazole and tolylazole. Effective amounts of solvent for the coatings, e.g., water or an organic solvent range up to about 50%, e.g., from about 10-25% by weight of the wet coating.

The binder for the film-forming coating composition is selected from the group consisting of the inorganic binders such as the siloxanes, polyacrylates, polyurethanes, polyimides, polymers derived from epoxies, polymers derived from isocyanates, and the uncured pre-polymers or monomers of said polymers. The film-forming binder also can be selected from the group consisting of inorganic polymers derived from silanes, siloxanes and silicones.

Example 1

Composition and Process to Apply a Coating to 99.99% Aluminum Particles or Powder Pigments To one liter of distilled water, add 3.0 grams of basic chromium sulfate, 4.0 grams of potassium hexafluorozirconate, and 0.12 grams potassium tetrafluoroborate. Stir solution until all chemicals are dissolved in $H_2O$. Let stand for seven days before use to allow for the inorganic polymer of chromium sulfate to complex with the fluoride salts and equilibrate. Dilute this solution to 40% by volume with distilled water.

Add approximately 100 grams of spherical 20 micron 99.99% aluminum power particles to a one-liter flask. To the flask, add approximately 500 milliliters of the inorgnic polymers solution at ambient conditions and agitate or stir for approximately five minutes. The powder tends to settle quickly in the solution so constant agitation is necessary. After five minutes, decant off the inorganic polymer solution. The wet coated powder was added slowly to a large Buchner funnel with filter paper. As the wet slurry was added, a vacuum was applied. The powder was rinsed approximately three, times with distilled water to remove unreacted nonorganic polymer solution. After rinsing, the powder cake and filter paper were removed and placed on a large watch glass and allowed to dry at ambient conditions overnight. In the morning, the coated powder was dry to handle and placed in a glass container and sealed.

Example 2

An identical process as Example 1, except that the metal being coated is 5 micron of 99% zinc particles.

Example 3

Second Composition and Process to Apply a Coating to Aluminum Particles

An identical process as Example 1, except that 2.0 grams per liter of zinc sulfate was added to the inorganic polymer solution after reacting for seven days and after diluting $H_2O$ to 40 volume %.

Example 4

Third Composition and Process for Applying a Coating to Aluminum Particles

An identical process as Example 1, except that the 20 micron 99.99% pure aluminum particles were milled for 3 days in a horizontal ball mill to create flake-like particles before the coating process.

Example 5

Composition and Process to Apply a Coating to Iron Particles

An identical process as Example 1, except that the metal being coated is 10 micron of 99.9% iron particles.

Example 6

Composition and Process to Apply a Coating to Nickel Particles

An identical process to Example 1, except that the metal being coated is 10 micron of Ni particle agglomerate. The nickel was activated by an acid wash prior to being treated with the coating solution.

Example 7

Composition and Process to Apply a Coating to Silver Particles

An identical process as Example 1, except that the metal being coated is 5 micron of 99% silver particles.

Example 8

Composition and Process to Apply a Coating to Phosphated Iron Particles

Example 9

Composition of a Conductive Grease Made with Coated Nickel Particles

Particles coated per Example 6 were blended with a liquid polydimethylsiloxane to join the polymer coating up to the point where the composition had acceptable viscosity and properties to be spreadable onto a metal substrate. Approximately 11% of the coated powder was blended into the polydimethylsiloxane.

Example 10

Composition of Corrosion-Resistant Primer Coating was Made with Coated Zinc Particles of this Invention

Particles coated per Example 2 were used to make a corrosion-resistant primer coating. Coated zinc was added to an epoxy resin with an amine curing agent at approximately 58 volume percent. This coating was spray applied to aluminum alloy test panels of 2024-T3 and 7075-T6 and allowed to cure for 24 hours. After curing, the coatings were scribed to the base metal and placed in ASTM B117 and ASTM G85 Annex 4 accelerated salt fog test cabinets. Panels were held in plastic racks at 15 degrees from the vertical. These coatings were compared to a similar epoxy coating that was prepared using uncoated zinc powder.

The inorganic and organic polymeric binders used for preparing the corrosion-inhibiting pigment coating compositions range from about 5 to 80 or 20 to 80 parts and preferably 30 to 50 or 50 to 70 parts by weight of the cured coatings. The film-forming binders used in preparing the coatings for substrates include polymers derived from the inorganic polymers such as the siloxanes, the epoxies, isocyanates, acrylics, and the uncured polymers or precursors of these polymers including the polyimides and the precursors, i.e., the polyamic acids. The imide polymers are well known and include polyimide precursors derived from aromatic dianhydrides, polyamines and reactive crosslinkable monofunctional endcaps. Preferred dianhydrides include pyromeliticdianhydride; benzophenone tetracarboxylic dianhydride; (hexafluoroisopropylidene)-bis(phthalic anhydride) biphenyltetracarboxylic dianhydride and benzophenone tetracarboxylic dianhydride. Various polyfunctional aromatic amines, including diamines, triamines and tetra-amines and mixtures thereof can be used to prepare the polyimide precursors or polymers.

Other known polymers include polymers of the epoxies or epoxy-resins or the precursors, and polymers derived from isocyanates. For purposes of this invention, the term "epoxy precursors" includes epoxy or epoxie compounds having one or more oxirane groups, i.e., an oxygen atom bonded to vicinal carbon atoms. Various precursors of epoxies particularly suitable for purposes of this invention are precursors that are liquid at room temperature. Specifically, the epoxy precursors include compounds which can be characterized either as saturated or unsaturated aliphatic, cycloaliphatic, aromatic or heterocyclic compounds. The curable epoxy precursors may be prepared in various solvents including organic solvents which escape from the coating by evaporation during the curing step. These solvents are well known and include, for example, esters such as butyl acetate, acetates of ethylene glycol monoethyl ether (Cellosolve acetate), methyl Cellosolve acetate, and the ether alcohols.

Another preferred binder for the corrosion-inhibiting metal coatings comprises the polyurethanes derived from isocyanates and more particularly the aliphatic polyurethanes derived from the reaction of polyols and multifunctional aliphatic isocyananates. The polyol is preferably used in an organic solvent e.g., toluene, xylene, n-butyl acetate, methylethyl ketone, etc. The hydroxyl number of the polyol, and the isocyanate (NCO) content or the equivalent weights of the isocyanate and polyol are determined in order to obtain the desired polyurethane. The preferred polyols and isocyanates are reacted in approximately stoichiometric amounts so that the NCO to hydroxyl ratio ranges from about 0.85 to 1.6 equivalent of the NCO to 1.0 equivalent of the OH. Specific compounds used in preparing these binders include, for example, isocyanates such as: diphenylmethane-4,4'-diisocyanate, toluene2,4-diisocyanate, tetramethylene diisocyanate, decamethylene diisocyanate, ethylene diisocyanate, propylene-1,2-diisocyanate, and the like. Preferred polyisocyanates include hexamethylene diiocyanate and methylene-bis (4-cyclohexyl isocyanate) e.g., DISMODUR-N. By selecting the proper polyols and by adjusting the NCO to OH ratio, the physical properties and efficiency of the film, such as the strength of film, flexibility, chemical resistance, solvent resistance, etc. can be controlled over a wide range.

Examples of other binders include the polyacrylates, such as the polyalkylacrylates, polymethacrylates, polymethylmethacrylate, polybutylmethacrylate, polyethylmethacrylate, polypropylmethacrylate, and combinations thereof. Also included as binders are the water soluble acrylics latex-emulsion coatings. Inorganic binders that can be used in the present invention include those described in L. Smith ed., Generic Coating Types: An Introduction to Industrial Maintenance Coating Materials, Pittsburgh, Pa. This Technology Publication is incorporated by reference. For example, the coating compositions prepared with inorganic binders which have a modified $SiO_2$ structure can be derived from silicates, silanes, siloxanes or silicones. The coatings can be applied to the substrate in the form of a suspension or solution in a suitable solvent such as water as in latex coatings or combination of solvents. Application can be carried, out for example, by any technique, such as spraying, brushing, rolling, flooding, immersion, to achieve a suitable coating thickness, ranging up to about ten (10) mils.

A variety of organic solvents are known which can be used for purposes of this invention in preparing organic coatings. The preferred solvents are substantially non-polar or oleophilic solvents. These solvents include aromatic or aliphatic hydrocarbons. Aromatic solvents include benzene, toluene, xylenes, naptha, and fractions from the distillation of petroleum. Aliphatic hydrocarbon solvents include hexane, cyclohexane, heptanes, octanes and similar straight and branched hydrocarbons and mixtures thereof, generally having 4-16 carbon atoms. Included are the aliphatic fractions from distillation of petroleum including mineral spirits and various mixtures of these solvents in any ratio. Aqueous systems include the acrylic resins well known for use in latex coatings.

The wetting agents or surfactants used to apply the coatings to the metal surface or substrate are added to the coatings in amounts ranging from about 0.0-5.0 parts by weight and preferably in amounts ranging from about 0.1 to 2.0 or 0.1 to 1.5 part. These wetting agents preferably include the lower weight glycols, such as ethylene or propylene glycols, the aliphatic alcohols, alkoxyalcohols, ethers, etheralcohols, glycol ethers, and combinations thereof.

The viscosity or thickening of the coating may be adjusted for the particular method of application by adding water for latex coatings or inert organic solvents for organic coatings. The coated metal surface may be dried by exposure to air or by baking. If the coating composition is of correct viscosity, the coating or film can be applied directly to the metal surface and baking may not be necessary. The film thickness may not be critical, however, an effective amount sufficient to form a coating ranges up to about 0.004 inches or more per square foot for coatings.

In general, an effective amount of the corrosion-inhibiting resin coatings are applied onto the metal substrates or onto the metal pigments at thickness ranging from about 0.001 to 0.003 inches, e.g., up to ten mils or more. The coating may be applied onto the metal substrates by various methods including spraying, rolling, or brushing onto the metal substrate depending on the viscosity. The viscosity of the coating for the particular application may be achieved by adjusting the content of the solvent within the ranges specified and by the selection of the particular reactants used to form the polymeric binder.

While this invention has been described by a number of specific examples, it is obvious to one skilled in the art that there are other variations and modifications which can be made without departing from the spirit and scope of the invention as particularly set forth in the appended claims.

The invention claimed is:

1. Electrochemically corrosion-resistant compositions for application onto metal substrates in amounts ranging up to ten mils consisting essentially of, in parts by weight, from about:
5 to 80 parts of lubricating grease, from about
0.1 to 10 parts of at least one organic corrosion inhibitor, from about
0.1 to 5.0 parts or a surfactant, from about
1.0 to 5.0 parts of an organic solvent, and from about
20-80 parts of a sacrificial-metal pigment having a particle size ranging from about 2 to 100 microns; said metal pigment coated with an effective amount of metal oxides derived from an acidic aqueous solution consisting essentially of from about:
0.01 to 22 parts of a trivalent chromium compound, from about
0.01 to 12 parts of hexafluorozirconate, from about
0.01 to 12 parts of at least one fluorocarbon, from about
0.0-12 parts of a divalent zinc compound, and from about
0.0-5 parts by weight of water soluble corrosion inhibitor.

2. The corrosion-resistant composition of claim 1 wherein the coated sacrificial-metal pigment is zinc.

3. The corrosion-resistant composition of claim 1 wherein the coated sacrificial-metal pigment is nickel and the acidic solution contains 12 parts of divalent zinc compound.

4. The corrosion-resistant composition of claim 1 wherein the coated sacrificial-metal pigment is aluminum and the oxide is derived from a trivalent chromate and a fluorozirconate.

5. The corrosion-resistant composition of claim 1 wherein the coated sacrificial-metal pigment is iron and the oxide is derived from a zirconate.

6. The corrosion-resistant composition of claim 1 wherein the corrosion inhibitor is a triazole.

7. The corrosion-resistant composition of claim 1 wherein the corrosion inhibitor is benzotriazole.

8. The corrosion-resistant composition of claim 7 wherein the corrosion-inhibitor is present in an amount of about 5 parts by weight.

* * * * *

UNITED STATES PATENT AND TRADEMARK OFFICE
CERTIFICATE OF CORRECTION

| | | |
|---|---|---|
| PATENT NO. | : 9,243,150 B2 | Page 1 of 1 |
| APPLICATION NO. | : 13/564341 | |
| DATED | : January 26, 2016 | |
| INVENTOR(S) | : Matzdorf et al. | |

It is certified that error appears in the above-identified patent and that said Letters Patent is hereby corrected as shown below:

Title page

Please correct Item (74) Attorney, Agent or Firm's name to:

Mark O. Glut, NAWCAD

Signed and Sealed this
Tenth Day of May, 2016

Michelle K. Lee
*Director of the United States Patent and Trademark Office*